(12) United States Patent
Swarr et al.

(10) Patent No.: US 8,497,935 B2
(45) Date of Patent: Jul. 30, 2013

(54) ROTATABLE CAMERA SYSTEM INCLUDING INFRARED COMMUNICATIONS LINKS

(75) Inventors: Lonnel J Swarr, Lancaster, PA (US); Theodore L Jones, Akron, PA (US)

(73) Assignee: Robert Bosch GmbH, Stuttgart (DE)

( * ) Notice: Subject to any disclaimer, the term of this patent is extended or adjusted under 35 U.S.C. 154(b) by 3001 days.

(21) Appl. No.: 10/926,799

(22) Filed: Aug. 26, 2004

(65) Prior Publication Data
US 2006/0044406 A1  Mar. 2, 2006

(51) Int. Cl.
*H04N 5/225* (2006.01)
(52) U.S. Cl.
USPC .......................................... 348/373; 348/211
(58) Field of Classification Search
USPC .............. 348/14.02, 14.05, 143, 151, 211.99,
348/211.1, 211.2, 211.5, 211.9, 240.99, 240.3,
348/345, 373, 374, 375, 376; 398/106, 107,
398/114; 439/20, 21, 22, 930
See application file for complete search history.

(56) References Cited

U.S. PATENT DOCUMENTS

| | | | | |
|---|---|---|---|---|
| 2,527,969 A * | 10/1950 | Siebenkittel | ................... | 40/433 |
| 2,568,995 A * | 9/1951 | Eckhardt, Jr. | ................... | 84/102 |
| 3,732,368 A * | 5/1973 | Mahlab | ................... | 348/151 |
| 4,673,268 A | 6/1987 | Wheeler et al. | ................ | 352/243 |
| 4,918,473 A * | 4/1990 | Blackshear | ................ | 396/427 |
| 4,945,367 A * | 7/1990 | Blackshear | ................ | 396/427 |
| 4,974,088 A * | 11/1990 | Sasaki | ................ | 348/211.6 |
| 5,418,567 A * | 5/1995 | Boers et al. | ................ | 348/375 |
| 5,557,443 A * | 9/1996 | Nakamura et al. | ................ | 398/30 |
| 5,627,616 A | 5/1997 | Sergeant et al. | ................ | 354/81 |
| 5,647,569 A * | 7/1997 | Sofy | ................ | 248/522 |
| 5,657,544 A * | 8/1997 | Ota et al. | ................ | 33/1 N |
| 5,690,498 A * | 11/1997 | Sobhani | ................ | 439/22 |
| 5,704,792 A * | 1/1998 | Sobhani | ................ | 439/21 |
| 5,802,412 A * | 9/1998 | Kahn | ................ | 396/427 |
| 5,805,115 A | 9/1998 | Pellerin et al. | ................ | 343/763 |
| 5,850,579 A * | 12/1998 | Melby et al. | ................ | 396/427 |
| 5,865,629 A | 2/1999 | Bernardini | ................ | 439/26 |
| 6,089,875 A | 7/2000 | Iwata et al. | ................ | 439/26 |
| 6,222,297 B1 | 4/2001 | Perdue | ................ | 310/232 |
| 6,353,693 B1 * | 3/2002 | Kano et al. | ................ | 385/26 |
| 6,356,002 B1 | 3/2002 | Witherspoon et al. | ................ | 310/232 |
| 6,400,903 B1 * | 6/2002 | Conoval | ................ | 396/56 |

(Continued)

OTHER PUBLICATIONS

Brochure Panasonic Super Dynamic III Color Dome Camera with Low-LIght B/W Mode WV-CS854A—2 pages.

(Continued)

*Primary Examiner* — Aung S Moe
*Assistant Examiner* — Chriss Yoder, III
(74) *Attorney, Agent, or Firm* — Faegre Baker Daniels LLP

(57) ABSTRACT

A camera system includes a camera assembly and a base. A mounting assembly rotatably mounts the camera assembly on the base. The camera assembly is rotatable through a range of 360 degrees relative to the base about an axis of rotation. The mounting assembly provides electrical communication between the camera assembly and the base. A first emitter and a first detector wirelessly communicate signals therebetween. One of the first emitter and the first detector is mounted on the camera assembly and the other of the first emitter and the first detector is mounted on the base. A second emitter and a second detector wirelessly communicate signals therebetween. One of the second emitter and the second detector is mounted on the camera assembly and the other of the second emitter and the second detector is mounted on the base.

15 Claims, 5 Drawing Sheets

U.S. PATENT DOCUMENTS

| | | | |
|---|---|---|---|
| 6,479,813 B2 * | 11/2002 | Takada et al. | 250/239 |
| 6,517,357 B1 | 2/2003 | Athanasiou et al. | 439/26 |
| 6,611,661 B2 | 8/2003 | Buck | 396/19 |
| 6,615,501 B2 * | 9/2003 | Skerka et al. | 33/324 |
| 6,628,338 B1 | 9/2003 | Elberbaum et al. | 348/373 |
| 6,707,189 B2 * | 3/2004 | Ito et al. | 310/75 R |
| 6,894,724 B2 * | 5/2005 | Patel et al. | 348/373 |
| 7,292,265 B2 * | 11/2007 | Kawazoe et al. | 348/169 |
| 7,364,108 B2 * | 4/2008 | Kim et al. | 242/370 |
| 2002/0067425 A1 | 6/2002 | Iverson | 348/373 |
| 2002/0140814 A1 * | 10/2002 | Cohen-Solal et al. | 348/172 |
| 2002/0176138 A1 | 11/2002 | Schlanger | 359/172 |
| 2003/0045354 A1 | 3/2003 | Giobbi | 463/40 |
| 2003/0103770 A1 | 6/2003 | Arbuckle | 396/427 |
| 2003/0156842 A1 * | 8/2003 | Morimoto et al. | 398/107 |
| 2003/0214601 A1 | 11/2003 | Yuen | 348/375 |
| 2003/0222990 A1 | 12/2003 | Driska et al. | 348/211.2 |
| 2005/0185058 A1 * | 8/2005 | Sablak | 348/208.99 |

OTHER PUBLICATIONS

Webpage www.panasonic.com Product Showcase 2004—4 pp, (Dec. 30, 2003).

Webpage www.elitar.com Product Cataloge E:-PT8X0 Series Color PTZ Camera 2003—4 pp, (Dec. 30, 2003).

* cited by examiner

ROTATABLE CAMERA SYSTEM INCLUDING INFRARED COMMUNICATIONS LINKS

BACKGROUND OF THE INVENTION

1. Field of the Invention

The present invention relates to a rotatable video camera, and, more particularly, to a communication system for transmitting data signals to remotely control a rotatable video camera, and for receiving video and data signals from a rotatable video camera, wherein the data and video signals may be modulated.

2. Description of the Related Art

There are numerous known video surveillance systems which may be used to monitor a given space or track a moving object such as a person or vehicle. Some such systems utilize fixed cameras having a stationary field of view (FOV). To fully cover a given surveillance site with a fixed camera system, however, it will oftentimes be necessary to use a significant number of fixed cameras.

Movable cameras which may pan, tilt and/or zoom are also known. Panning involves rotating the camera about a substantially vertical axis of rotation. Tilting involves rotating the camera about a substantially horizontal axis of rotation. Zooming involves adjusting the focal length of the camera, such as by modifying the distances between lens elements. The use of a PTZ (pan, tilt, zoom) camera system will typically reduce the number of cameras required for a given surveillance site and also thereby reduce the number and cost of the video feeds and system integration hardware such as multiplexers and switchers associated therewith. Another advantage of PTZ camera systems is that they can be controlled to automatically focus upon and follow a target of interest without operator intervention. Real-time video content analysis can be used to control the panning, tilting and zooming of a camera such that a target is acquired and followed automatically. The real-time video content analysis can be performed either remotely, or locally in the system controller processor of the camera.

Control signals for directing the pan, tilt, zoom movements typically originate from a human operator via a joystick or from an automated video tracking or surveillance system. The control signals are generally transmitted from a stationary portion of the system to the movable camera. Of the three common types of camera movement, panning, tilting and zooming, it is generally desirable to allow the camera to have an unlimited or continuous range panning motion, while tilting and zooming typically involve motion that is restricted within a range having two end points. Wires or flex circuit connections can be used in applications where panning is restricted within a range having two end points. However, the use of slip rings may be necessary to provide the camera with continuous panning motion. It is also common to mount a PTZ camera such that the panning interface occurs between a stationary base and camera assembly. In contrast, the tilting motion of the camera typically occurs between two portions of the camera assembly which are both being rotated relative to the panning axis.

Various assemblies have been developed to provide electrical communication across the panning interface between the stationary portion of the system and the moveable camera assembly that will allow the indefinite or continual rotation of the camera assembly about the panning axis. For example, slip rings may be used to provide electrical communication across a rotational interface without restricting the range of such rotation. Known slip rings include drum style and platter style slip rings. Such slip rings rely upon sliding engagement between electrical contacts to provide electrical communication. One drawback of such slip rings is that the sliding contacts are inherently noisy in an electrical sense. The slidable contacts of a slip ring are also subject to wear which may result in a loss of electrical contact or degradation of the electrical connection provided by the contact which exacerbates the electrical noise problem.

It is also known to use a light emitting device and a light sensitive device both of which are positioned on the panning axis to transmit signals across the panning interface in a single direction.

It would be desirable in the art to provide an improved camera system that allows the camera to pan indefinitely without losing communication with a stationary base, and that allows bi-directional communication between the camera and the stationary base without a high level of electrical noise.

SUMMARY OF THE INVENTION

The present invention provides a camera system including infrared links that enable wireless bi-directional communication between the camera and a base unit throughout the camera's rotation relative to the base unit and with a low level of noise.

The invention comprises, in one form thereof, a camera system including a base having a first light emitter and a first light detector. A camera assembly is rotatably mounted relative to the base and includes a second light emitter and a second light detector. The first light emitter remains in communication with the second light detector during rotation of the camera assembly. The second light emitter remains in communication with the first light detector during rotation of the camera assembly.

The invention comprises, in another form thereof, a camera system including a base having a first light emitter and a first light detector. A camera assembly includes a second light emitter and a second light detector. The camera assembly is rotatable relative to the base about an axis of rotation intersecting at least one of the first light emitter and the first light detector and at least one of the second light emitter and the second light detector.

The invention comprises, in yet another form thereof, a camera system including a camera assembly and a base. A mounting assembly rotatably mounts the camera assembly on the base. The camera assembly is rotatable through a range of 360 degrees relative to the base about an axis of rotation. The mounting assembly provides electrical communication between the camera assembly and the base. A first emitter and a first detector wirelessly communicate signals therebetween. One of the first emitter and the first detector is mounted on the camera assembly and the other of the first emitter and the first detector is mounted on the base. A second emitter and a second detector wirelessly communicate signals therebetween. One of the second emitter and the second detector is mounted on the camera assembly and the other of the second emitter and the second detector is mounted on the base.

An advantage of the present invention is that the camera can pan in one direction indefinitely without losing communication with the base unit.

Another advantage is that no mechanical contacts, which are subject to mechanical wear, are required to carry information between the base and the camera.

Yet another advantage is that information can be communicated between the base and the camera with a low level of noise.

A further advantage is that the strengths of the signals between the base and the camera do not change throughout the rotation of the camera relative to the base.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
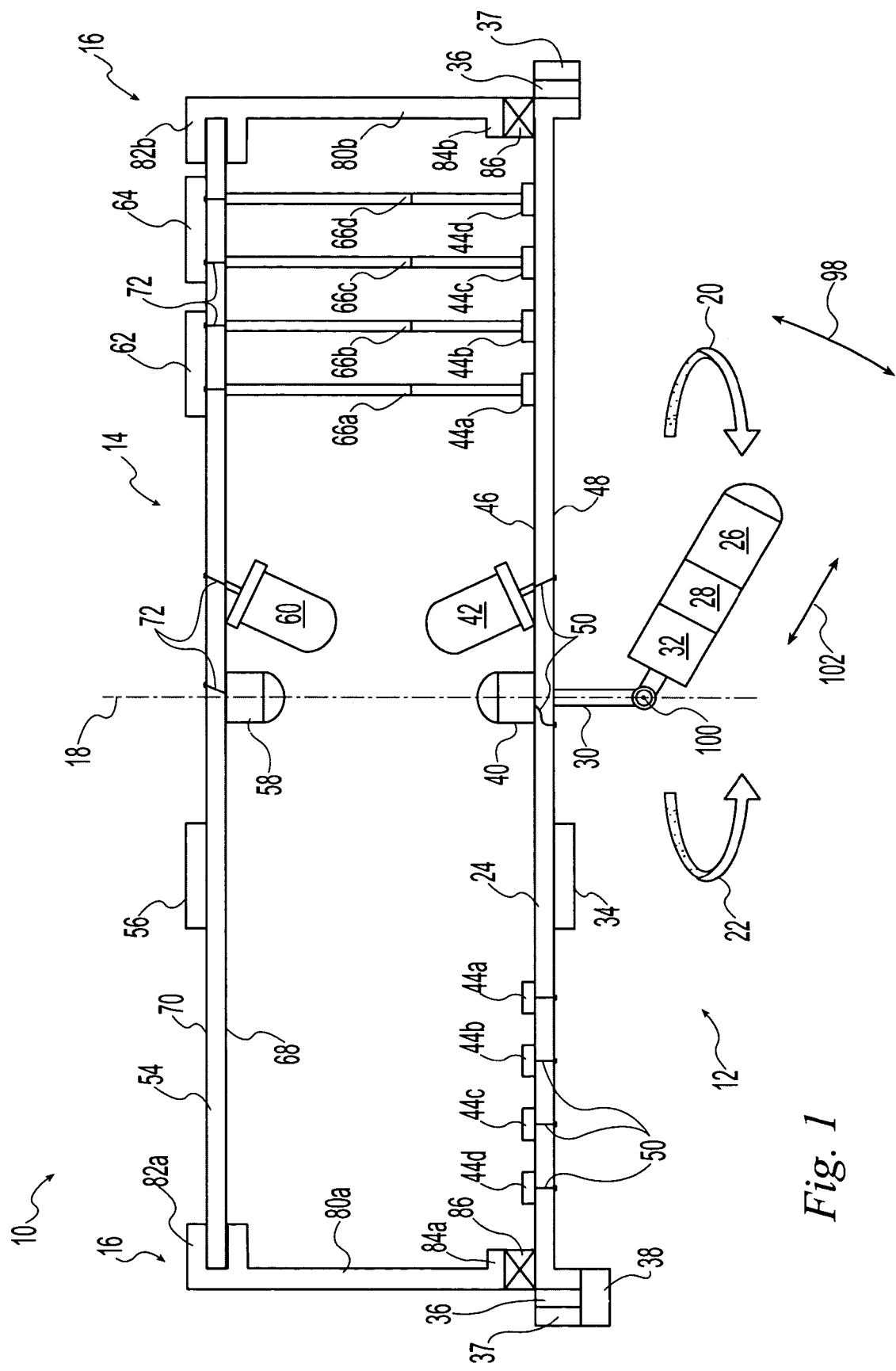
FIG. 1 is a schematic side view of one embodiment of a camera system of the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DESCRIPTION OF THE PRESENT INVENTION

In accordance with the present invention, there is shown in FIG. 1 one embodiment of a camera system 10 including a camera assembly 12, a base 14, and a mounting assembly 16. Mounting assembly 16 rotatably mounts camera assembly 12 on base 14 wherein camera assembly 12 is rotatable through a range of 360 degrees or greater relative to base 14 about an axis of rotation 18. More particularly, camera assembly 12 may be rotated indefinitely, i.e., in any number of complete rotations, in either of clockwise direction 20 or counterclockwise direction 22.

Schematically depicted camera assembly 12 includes a substrate 24, a camera 26, a focusing motor 28, a mounting arm 30, a tilting motor 32, electronics 34, a rack or belt sprocket 36, a toothed belt 37 operably coupled to a belt motor 38, an infrared (IR) light detector 40, an infrared (IR) light emitter 42, and conductive rings 44a, 44b, 44c, 44d. Substrate 24 is shown in the form of a two-sided printed circuit board having electronic elements on both an inner surface 46 and an outer surface 48. Circuit board 24 has conductive elements 50 on inner surface 46, outer surface 48 (e.g., conductive traces forming a portion of one layer of the printed circuit board) and between surfaces 46, 48 (e.g., conductively lined vias for communicating between layers of the printed circuit board) for carrying current and/or voltage signals between the various components connected to or on circuit board 24. Only a few of the conductive elements 50, i.e., conductive vias 50 that extend between surfaces 46, 48, are schematically depicted in FIG. 1 for illustrative purposes. Circuit board 24 may be circular, i.e., platter-shaped. The IR emitters and detectors used with the illustrated embodiment have a conventional construction and are well known to those having ordinary skill in the art.

Figure 2:
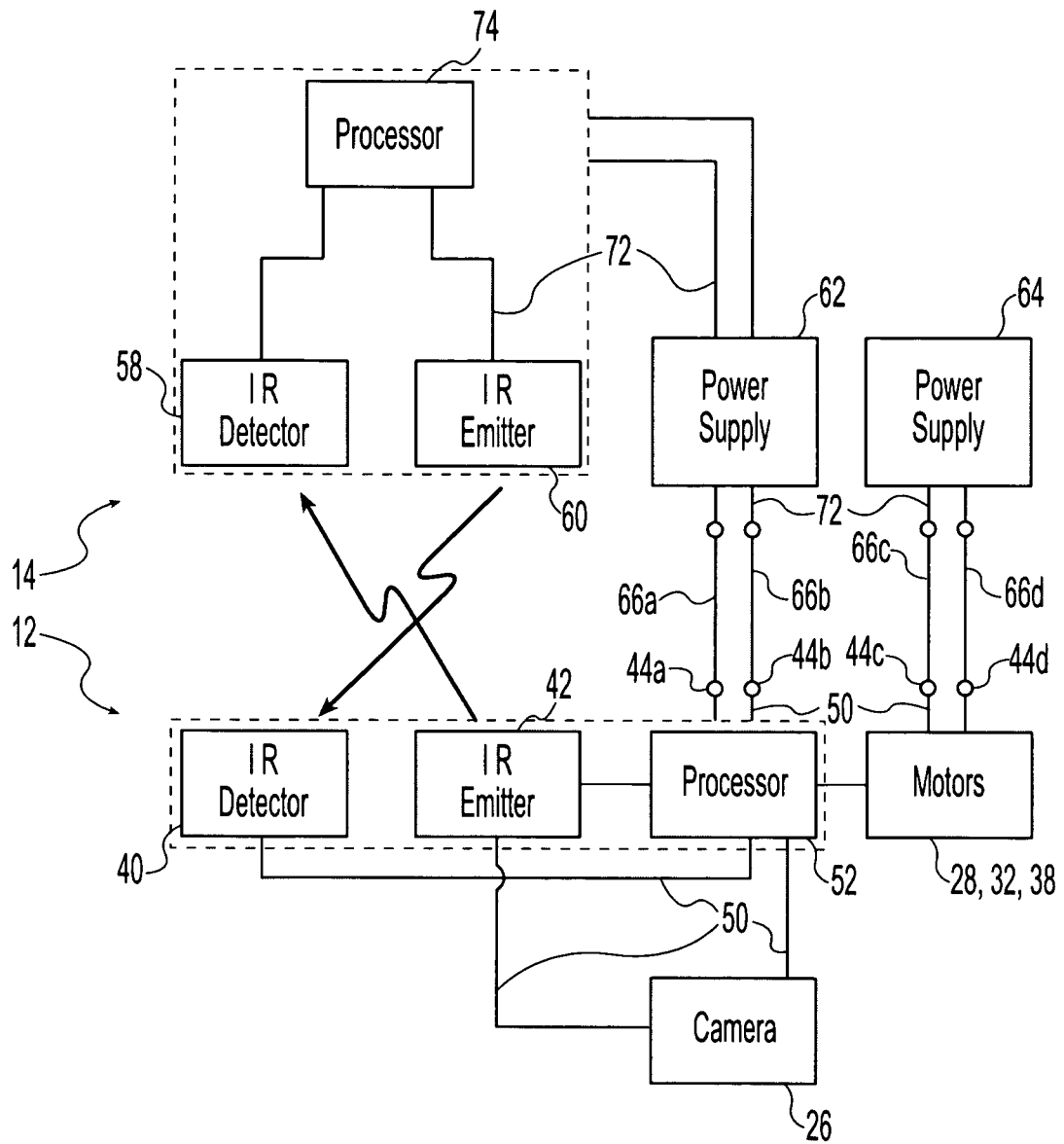
FIG. 2 is a block diagram of the camera system of FIG. 1.

Electronics 34 include a processor 52 (FIG. 2) in electrical communication with camera 26, motors 28, 32, 38, IR detector 40, IR emitter 42, and conductive rings 44a, 44b through various conductive elements 50. IR detector 40 is mounted on substrate 24 and is positioned on and intersected by axis of rotation 18. IR emitter 42 is mounted on substrate 24 and is spaced laterally or horizontally from axis of rotation 18.

Figure 3:
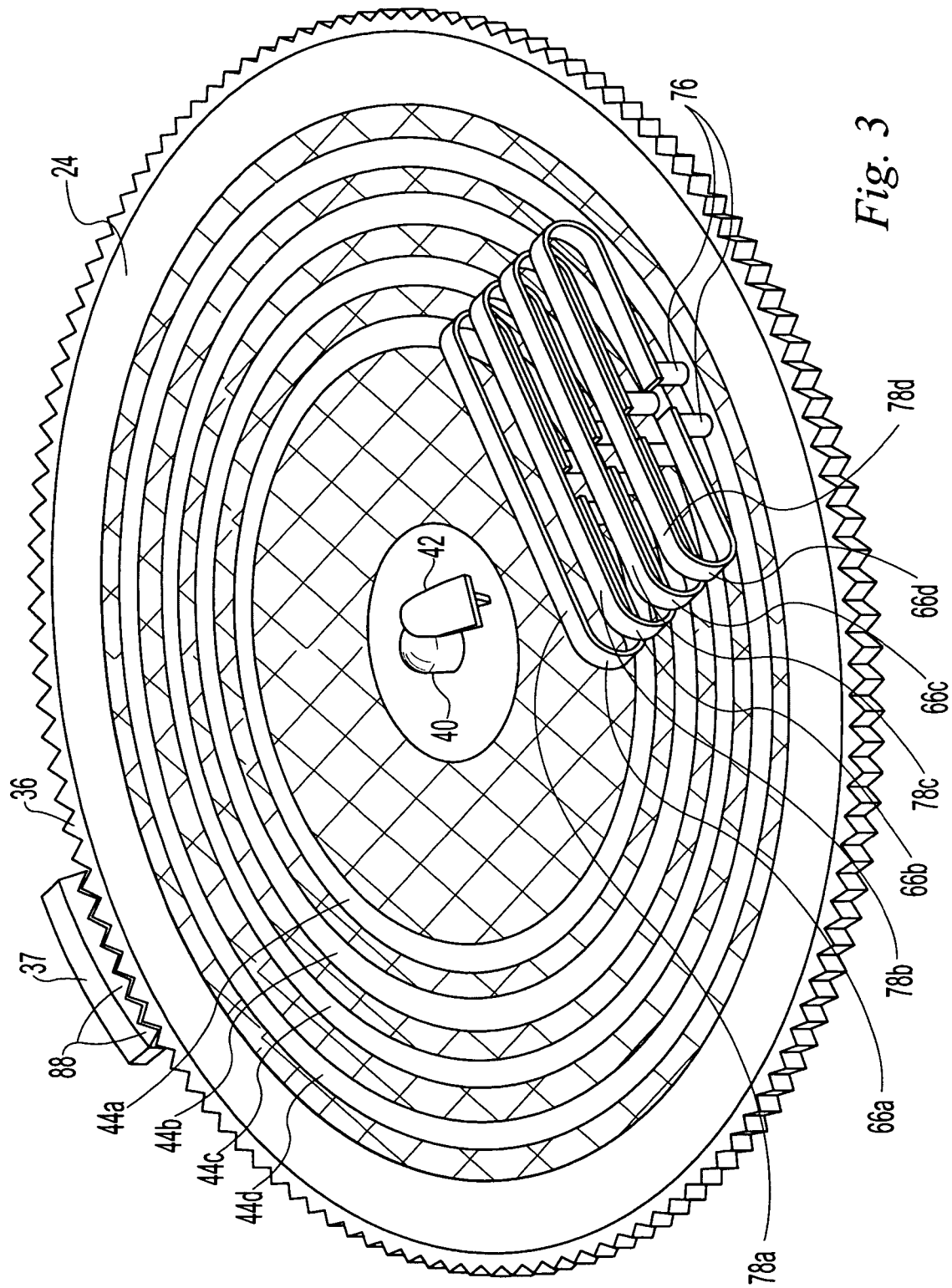
FIG. 3 is an overhead perspective view of the camera assembly and associated brushes of the camera system of FIG. 1.

Motors 28, 32, 38 are each in electrical communication with conductive rings 44c, 44d through various conductive elements 50. As best shown in FIG. 3, conductive rings 44a, 44b, 44c, 44d are each circular and continuous, and may be formed of a conductive metal such as copper. Conductive rings 44a, 44b, 44c, 44d function as input power ports for camera assembly 12, as described below.

Base 14 includes a substrate 54, electronics 56, an infrared (IR) light detector 58, an infrared (IR) light emitter 60, a DC power supply 62, and a DC power supply 64. Substrate 54 is shown in the form of a two-sided printed circuit board having electronic elements on both an inner surface 68 and an outer surface 70. Circuit board 54 has conductive elements 72 on inner surface 68, outer surface 70 and between surfaces 68, 70 for carrying current and/or voltage signals between the various components connected to or on circuit board 54. Only a few of the conductive elements 72, i.e., conductive vias 72 that extend between surfaces 68, 70, are schematically depicted in FIG. 1 for illustrative purposes.

Electronics 56 include a processor 74 in electrical communication with IR detector 58, IR emitter 60, power supply 62, and power supply 64 via various conductive elements 72. IR detector 58 is mounted on substrate 54 and is positioned on and intersected by axis of rotation 18. IR emitter 60 is mounted on substrate 54 and is spaced laterally or horizontally from axis of rotation 18.

Mounting assembly 16 includes brushes 66a, 66b, 66c and 66d. Power supply 62 is in electrical communication with brushes 66a, 66b through conductive elements 72. Power supply 64 is in electrical communication with brushes 66c, 66d through conductive elements 72. As best shown in FIG. 3, brushes 66a, 66b, 66c, 66d are each substantially oval and loop-shaped, and have a pair of pads 76 terminating respective ends of the brush. The distal ends of pads 76 are in electrical contact with corresponding ones of conductive rings 44a, 44b, 44c, 44d. Each of brushes 66a, 66b, 66c, 66d has a respective, elongate linear section 78a, 78b, 78c, 78d disposed opposite from pads 76. Each of linear sections 78a, 78b, 78c, 78d may be welded or otherwise attached to inner surface 68 of substrate 54 such that each of brushes 66a, 66b, 66c, 66d is electrically connected to a respective conductive element 72. Alternatively, mounting assembly 16 may hold each of brushes 66a, 66b, 66c, 66d in physical contact with a respective conductive element 72, perhaps through a contact pad (not shown) on inner surface 68 of substrate 54. Each of brushes 66a, 66b, 66c, 66d may be formed of an electrically conductive metal, such as copper. Thus, brushes 66a, 66b, 66c, 66d function as output power ports for base 14 and provide electrical power or electrical communication between camera assembly 12 and base 14.

Mounting assembly 16 also includes a pair of outer brackets 80a, 80b attached to a ball bearing 86 for rotatably mounting camera assembly 12 on base 14. Each of brackets 80a, 80b includes a respective base-end 82a, 82b for clamping or otherwise attaching to substrate 54. Respective camera-ends 84a, 84b of brackets 80a, 80b, in conjunction with bearing 86 and brushes 66a, 66b, 66c, 66d, rotatably retain substrate 24 at a substantially constant axial distance relative to substrate 54. Brackets 80a, 80b can be fixedly held in position relative to each other by one or more connecting brackets (not shown)

that are attached to brackets 80*a*, 80*b* or brackets 80*a*, 80*b* may be the diametrically opposite ends of a single bracket that extends around the outer circumferences of substrates 24, 54. Other methods of supporting the two circuit boards which permits their relative rotation may also be employed with the present invention.

Annular rack 36 is attached to and extends around the circumference of substrate 24 to form a complete circle. A fragment of belt 37 is shown in FIG. 3. Belt 37 has inwardly facing teeth 88 that are sized to engage and mesh with the teeth of rack 36. Teeth 88 extend around the entire inner surface of belt 37.

In operation, IR emitter 60 flashes infrared light to thereby wirelessly communicate serial data signals to IR detector 40 for controlling camera assembly 12. Similarly, IR emitter 42 flashes infrared light to thereby wirelessly communicate serial signals to IR detector 58. The signals transmitted to IR detector 58 may include video signals with video images captured by camera 26. The signals transmitted to IR detector 58 may also include data signals, e.g., the pan, tilt and zoom position of the camera. The video signals and data signals may be modulated together within the same signal stream transmitted to IR detector 58. The signals transmitted by emitters 42, 60 and received by detectors 40, 58 can be analog and/or digital signals.

Each of detectors 40, 58 may define a substantially conical range of reception defining a reception apex angle θ (FIG. 4) of between approximately 30 degrees and 90 degrees. In one embodiment, apex angle θ is approximately 60 degrees. The conical ranges of reception define coincident detector axes 90 that are aligned with axis of rotation 18. The conical range of reception may define the boundaries of an area 92 on a surface of a detector 40, 58 wherein the detectors can detect IR light that is incident within area 92.

Figure 4:
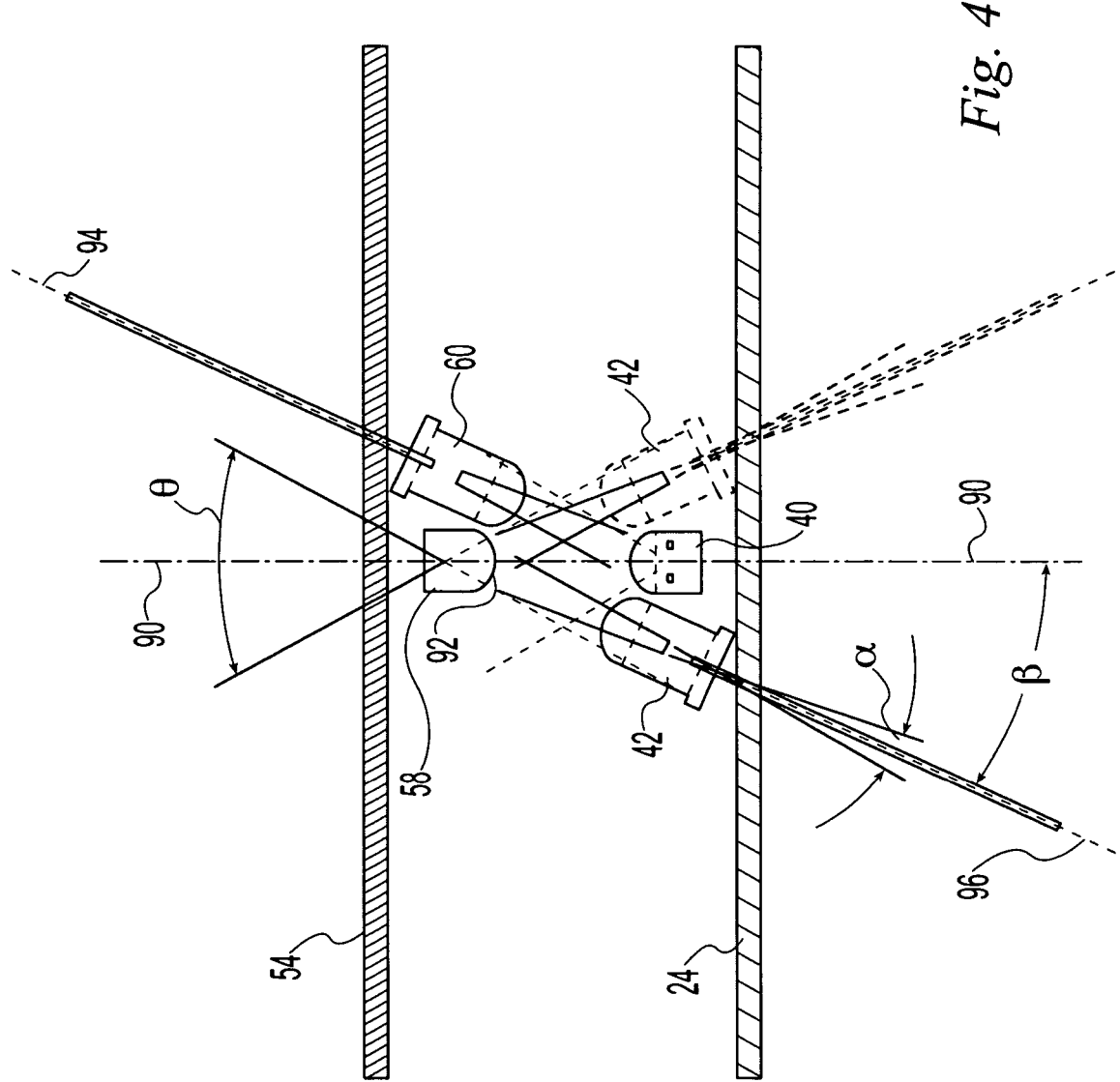
FIG. 4 is a side schematic view of the substrates, infrared detectors, and infrared emitters of the camera assembly and base of the camera system of FIG. 1.

Each of emitters 42, 60 may define a conical range of emission defining an emission apex angle α of approximately between 5 degrees and 20 degrees. In one embodiment, apex angle α is approximately 10 degrees. The conical range of emission defines the boundaries of a conical section of space wherein IR light from the emitter 42, 60 is transmitted. As can be seen in FIG. 4, IR light from emitter 42 is incident upon the receptive area 92 of detector 58. Similarly, IR light from emitter 60 is incident upon the receptive area 92 of detector 40.

Each of emitters 42, 60 defines a functional range having respective range axes or emitter axes 94, 96 that are oriented or positioned at angles β relative to axis of rotation 90. Angle β can be approximately between 15 degrees and 40 degrees. In one embodiment, angle β is approximately 25 degrees. Range axis 94 intersects axis of rotation 90 at a location defined by detector 40. Similarly, range axis 96 intersects axis of rotation 90 at a location defined by detector 58. In other words, emitters 42, 60 are "aimed" at detectors 40, 58 respectively. The angle β and the distance that emitters 42, 60 are spaced from axis of rotation 90 can be selected to increase the percentage of IR light emitted from emitters 42, 60 that is incident upon areas 92 of detectors 40, 58. In the embodiment illustrated in FIGS. 1-4, emitter 60 is positioned so that it does not block any IR light from emitter 42 that would otherwise be incident upon area 92 of detector 58. Similarly, emitter 42 can be positioned so that it does not block any IR light from emitter 60 that would otherwise be incident upon area 92 of detector 40. It is possible for angle β and/or the spacing from axis of rotation 90 for emitter 42 to be different than the angle β and/or spacing for emitter 60.

The control signals communicated from emitter 60 to detector 40 may include commands to pan, i.e., rotate, camera 26 in either clockwise direction 20 or counterclockwise direction 22. In response to these commands, processor 52 can cause motor 38 to rotate belt 37 either clockwise or counterclockwise as appropriate. The rotation of belt 37 in conjunction with the meshing of teeth 88 of belt 37 with the teeth of rack 36 results in the rotation of camera assembly 12 relative to base 14 and relative to mounting assembly 16. Brushes 66*a*, 66*b*, 66*c*, 66*d* remain in contact with respective conductive rings 44*a*, 44*b*, 44*c*, 44*d* throughout the rotation of camera assembly 12. More particularly, pads 76 of brushes 66*a*, 66*b*, 66*c*, 66*d* slide along conductive rings 44*a*, 44*b*, 44*c*, 44*d* throughout the rotation of camera assembly 12.

Because detector 40 is centered on axis of rotation 18, the position of detector 40 relative to emitter 60 does not change throughout the rotation of camera assembly 12. Thus, the percentage of IR light from emitter 60 that is incident upon detector 40 does not significantly vary during the rotation of camera assembly 12. That is, IR light from emitter 60 is continuously and substantially invariably received by detector 40 as substrate 24 rotates about axis 18. Similarly, because detector 58 is also centered on axis of rotation 18, and because detector 58 is symmetrical about axis 18, the percentage of IR light from emitter 42 that is incident upon detector 58 does not significantly vary during the rotation of camera assembly 12. That is, IR light from emitter 42 is continuously and substantially invariably received by detector 58 as substrate 24 rotates about axis 18. Although the orientation of emitter 42 changes with the rotation of camera assembly 12, the IR beam from emitter 42 remains centered on detector 58 and the angle of incident β does not change.

FIG. 4 illustrates the position of emitter 42 after 180 degrees of rotation. More particularly, the emitter 42 shown in solid lines on the left-hand side of axis 90 in FIG. 4 represents an arbitrary initial position of emitter 42. The emitter 42 shown in dashed lines on the right-hand side of axis 90 represents a position of emitter 42 after 180 degrees of rotation of camera assembly 12 about axis 90 in either clockwise direction 20 or counterclockwise direction 22. As can be seen, neither the angle β of orientation of emitter 42 nor the spacing of emitter 42 from axis 90 changes as a result of rotation of camera assembly 12.

The control signals communicated from emitter 60 to detector 40 may also include commands to tilt camera 26. That is, the control signals may include commands to rotate camera 26 in the directions indicated by double arrow 98 about an axis 100 that is directed into the page of FIG. 1. Mounting arm 30 and axis 100 are schematically depicted in FIG. 1 and are oriented perpendicular to panning axis 18 and parallel to substrate 24. Thus, camera assembly 12 is rotatable about two mutually perpendicular axes 18 and 100. In response to the commands to tilt camera 26, processor 52 causes motor 32 to rotate camera 26 about axis 100 in either of the clockwise and counterclockwise directions indicated by double arrow 98 as appropriate. As camera assembly 12 rotates in one of directions 20, 22, axis 100 may also rotate about axis 18 such that axis 100 is no longer oriented into the page of FIG. 1 but remains parallel to substrate 24.

The control signals communicated from emitter 60 to detector 40 may further include commands to zoom camera 26. That is, the control signals may include commands to move a lens (not shown) within camera 26 in the directions indicated by double arrow 102 relative to another lens (not shown) within camera 26 to thereby change the distance between the lenses. Thus, the focal length of camera 26 can be adjusted by zooming. In response to the commands to zoom camera 26, processor 52 can cause motor 28 to move a lens of camera 26 relative to the other lens of camera 26 in either of the directions indicated by double arrow 102 as appropriate.

As described above, the embodiment of FIGS. 1-4 utilizes a platter style slip ring to communicate electrical power to the camera assembly and bi-directional wireless communication to transmit control commands, video images and associated data to and from the camera assembly. In this manner, it is only the electrical power which is transmitted by mechanical contacts, which are more subject to noise than the IR emitters and receivers, and the control commands, video images and other data are transmitted by the IR emitters and receivers which are less subject to noise and thereby provide relatively high quality signal transmission to and from the camera.

Figure 5:
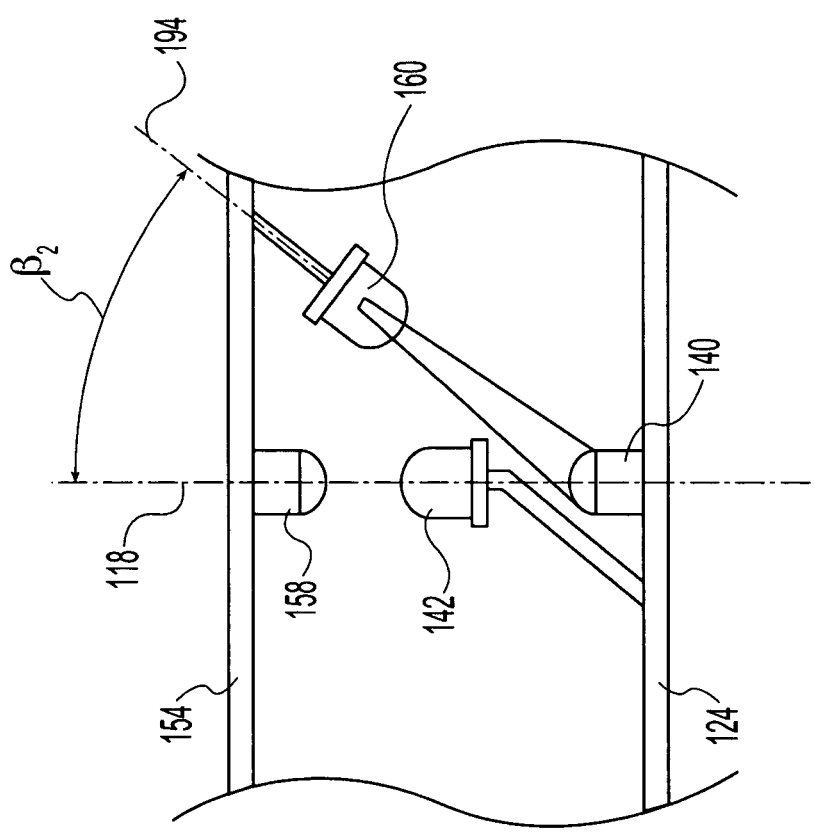
FIG. 5 is a side schematic view of another embodiment of the substrates, infrared detectors, and infrared emitters of a camera assembly and base of a camera system of the present invention.

In another embodiment, shown in FIG. 5, a camera system includes a camera assembly having a substrate 124 on which both an IR detector 140 and an IR emitter 142 are centered on an axis of rotation 118 about which the camera assembly is rotatable. Emitter 142 is supported by an elongate support arm between detectors 140, 158 on axis 118. The camera system also includes a base having a substrate 154 on which an IR detector 158 is centered on axis of rotation 118. The base also includes an IR emitter 160 that is spaced from axis 118 and oriented such that IR light from emitter 160 is substantially continuously received by detector 140 as substrate 124 rotates about axis 118. Emitter 160 defines an emitter axis 194 disposed at an angle $\beta_2$ relative to axis 118 such that substantially all of the conical range of emission of emitter 160 can intersect the receptive area on detector 140. When the assembly is rotated 180 degrees relative to the position shown in FIG. 5, however, the support arm on which emitter 142 is mounted will be positioned between emitter 160 and detector 140. If the support arm on which emitter 142 is mounted is thin enough and the receptive area on detector 140 substantially large enough that the support arm shadow does not entirely block the transmission of IR light between emitter 160 and detector 140, such an arrangement may also be used to provide bi-directional communication in addition to the arrangement shown in FIGS. 1-4. Both emitter 142 and detector 158 also remain centered on axis 118 throughout rotation of substrate 124, and thus IR light from emitter 142 is continuously and substantially invariably received by detector 158 as substrate 124 rotates about axis 118. Other aspects of the camera system of the embodiment of FIG. 5 are substantially similar to those of camera system 10, and thus are not described in detail herein.

In the embodiment shown in FIG. 5, the camera assembly includes an IR detector and an IR emitter that are both aligned on the rotational axis. However, it is also possible for the base, instead of the camera assembly, to have an IR detector and an IR emitter that are both aligned on the rotational axis. More particularly, in yet another embodiment (not shown), a camera system includes a base having an IR detector and an IR emitter that are both aligned on the rotational axis, similarly to emitter 142 and detector 140 of the embodiment of FIG. 5. In this case, the camera assembly can have an IR detector centered on the rotational axis, and an IR emitter spaced from the rotational axis and oriented with a clear path to the detector of the base. Thus, the emitters and detectors of this embodiment have positions that are reversed relative to the positions of the emitters and detectors in FIG. 5.

The camera system of the present invention may be modular, or may be compatible with modular camera systems. That is, the camera and possibly some associated parts of the camera system may be swapped with corresponding components of another compatible camera system. More particularly, it may be possible to replace or swap an entire camera assembly 12, or some parts thereof, with the corresponding components of another camera assembly.

While this invention has been described as having an exemplary design, the present invention may be further modified within the spirit and scope of this disclosure. This application is therefore intended to cover any variations, uses, or adaptations of the invention using its general principles.

What is claimed is:

1. A camera system comprising:
   a base including a first substrate having an inner surface and an outer surface, a power supply coupled to the first substrate, and a first light emitter and a first light detector coupled to the inner surface of the first substrate;
   a camera assembly including a camera and a pan, tilt and zoom adjustment mechanism to adjust a field of view of the camera, a second substrate having an inner surface and an outer surface, a second light emitter and a second light detector coupled to the inner surface of the second substrate, said first light emitter remaining in communication with said second light detector during rotation of said camera assembly, said second light emitter remaining in communication with said first light detector during rotation of said camera assembly;
   a mounting assembly configured to rotatably mount said camera assembly on said base, the mounting assembly including at least one conductive ring located the inner surface of one of the first and second substrates and at least one brush coupled to the inner surface of the other of the first and second substrates, each brush being configured to engage a corresponding conductive ring so that power is supplied from the power supply to the camera assembly through the at least one conductive ring and at least one brush, and wherein the first light emitter wirelessly communicates data signals to the first light detector to control the camera and the pan, tilt and zoom adjustment mechanism, and the second light emitter wirelessly communicates video signals including video images captured by camera and data signals indicative of pan, tilt and zoom positions of the camera to the second detector, the video signals and data signals being modulated together within a signal stream transmitted from the second light emitter to the second light detector;
   wherein each of said first and second emitters define a substantially conical range of emission defining an emission apex angle and wherein each of said first and second detectors define a substantially conical range of reception defining a reception apex angle, said reception apex angles being greater than said emission apex angles;
   wherein each of said first and second detectors are positioned wherein each of said substantially conical ranges of reception define a detector axis substantially aligned with an axis of rotation and wherein at least one of said first and second emitters is positioned wherein at least one of said substantially conical ranges of emission defines an emitter axis that is positioned at an angle to said axis of rotation and intersects said axis of rotation at a location defined by the detector with which it is in communication, and
   wherein said first and second emitters each define an emission apex angle of approximately between 5 and 20 degrees and wherein said first and second detectors each define a reception apex angle of approximately between 30 and 90 degrees.

2. The camera system of claim 1, wherein said first light emitter remains in communication with said second light detector and said second light emitter remains in communication with said first light detector throughout 360 degrees of rotation of said camera assembly.

3. The camera system of claim 1, wherein said camera assembly is rotatable through a range of 360 degrees relative to said base about an axis of rotation, said mounting assembly providing electrical communication between the camera assembly and said base.

4. The camera system of claim 3, wherein signals for controlling said camera assembly are communicated to said camera assembly by said first emitter and said second detector, and at least one of video images and control signals are communicated from said camera assembly by said second emitter and said first detector.

5. The camera system of claim 1, wherein said camera assembly is rotatable about two mutually perpendicular axes and has an adjustable focal length wherein rotation of said camera assembly about said two mutually perpendicular axes and adjustment of said focal length is controlled by signals wirelessly communicated to said camera assembly by said first emitter and said second detector.

6. The camera system of claim 1, wherein the camera assembly includes a camera and a pan, tilt and zoom adjustment mechanism to adjust a field of view of the camera, and wherein power is supplied from the power supply to the camera and the pan, tilt and zoom adjustment mechanism through the at least one conductive ring and at least one brush.

7. The camera system of claim 6, wherein the pan, tilt and zoom adjustment mechanism includes a first motor to control rotation of the camera, a second motor to control tilting of the camera, and a third motor to focusing of the camera, and wherein power is supplied from the power supply to the first, second and third motors through the at least one conductive ring and at least one brush.

8. The camera system of claim 1, wherein a plurality of continuous, circular conductive rings are formed on the inner surface of the second substrate, and a plurality of brushes are coupled to the inner surface of the first substrate, each of the plurality of brushes being electrically coupled to the power supply and configured to contact a corresponding conductive ring to transmit power from the power supply to the camera assembly.

9. The camera system of claim 1, wherein the mounting assembly includes an annular rack extending around a circumference of the second substrate and a drive belt configured to engage the annular rack and rotate the second substrate relative to the first substrate.

10. A camera system comprising:
a camera assembly and a base, the camera assembly including a camera and a pan, tilt and zoom adjustment mechanism to adjust a field of view of the camera;
a mounting assembly rotatably mounting said camera assembly on said base wherein said camera assembly is rotatable through a range of 360 degrees relative to said base about an axis of rotation, said mounting assembly providing electrical communication between the camera assembly and said base;
a first emitter and a first detector wirelessly communicating signals therebetween, said first detector being mounted on said camera assembly and said first emitter mounted on said base, the first emitter wirelessly communicating data signals to the first detector to control the camera and the pan, tilt and zoom adjustment mechanism; and
a second emitter and a second detector wirelessly communicating signals therebetween, said second emitter being mounted on said camera assembly and said second detector being mounted on said base, second emitter wirelessly communicating video signals including video images captured by camera and data signals indicative of pan, tilt and zoom positions of the camera to the second detector, the video signals and data signals being modulated together within a signal stream transmitted from the second emitter to the second detector;
wherein one of said first emitter and said first detector is positioned on said axis of rotation and the other of said first emitter and said first detector is spaced from said axis of rotation; and
wherein one of said second emitter and said second detector is positioned on said axis of rotation and the other of said second emitter and said second detector is spaced from said axis of rotation;
wherein each of said first and second emitters define a substantially conical range of emission defining an emission apex angle and wherein each of said first and second detectors define a substantially conical range of reception defining a reception apex angle, said reception apex angles being greater than said emission apex angles; and
each of said first and second detectors being positioned on said axis of rotation and each of said first and second emitters being spaced from said axis of rotation;
wherein each of said first and second detectors are positioned wherein each of said substantially conical ranges of reception define a detector axis substantially aligned with said axis of rotation and wherein each of said first and second emitters are positioned wherein each of said substantially conical ranges of emission define an emitter axis that is positioned at an angle to said axis of rotation and intersects said axis of rotation at a location defined by the respective first and second detector with which it is in wireless communication; and
wherein said first and second emitters each define emission apex angles of approximately 10 degrees and wherein said first and second detectors each define reception apex angles of approximately 60 degrees.

11. The camera system of claim 10, wherein said camera assembly is rotatable about two mutually perpendicular axes and has an adjustable focal length wherein rotation of said camera assembly about said two mutually perpendicular axes and adjustment of said focal length is controlled by signals wirelessly communicated to said camera assembly by said first emitter and said first detector.

12. The camera system of claim 10, wherein the base includes a first substrate having an inner surface and an outer surface, and a power supply coupled to the first substrate, the first emitter and the first detector being coupled to the inner surface of the first substrate, the camera assembly including a second substrate having an inner surface and an outer surface, the second emitter and the second detector being coupled to the inner surface of the second substrate, and wherein the mounting assembly includes at least one conductive ring located the inner surface of one of the first and second substrates and at least one brush coupled to the inner surface of the other of the first and second substrates, each brush being configured to engage a corresponding conductive ring so that power is supplied from the power supply to the camera and the pan, tilt and zoom adjustment mechanism through the at least one conductive ring and at least one brush.

13. The camera system of claim 12, wherein the pan, tilt and zoom adjustment mechanism includes a first motor to control rotation of the camera, a second motor to control tilting of the camera, and a third motor to focusing of the camera, and wherein power is supplied from the power supply to the first, second and third motors through the at least one conductive ring and at least one brush.

14. The camera system of claim 12, wherein a plurality of continuous, circular conductive rings are formed on the inner surface of the second substrate, and a plurality of brushes are coupled to the inner surface of the first substrate, each of the plurality of brushes being electrically coupled to the power supply and configured to contact a corresponding conductive ring to transmit power from the power supply to the camera and the pan, tilt and zoom adjustment mechanism.

15. The camera system of claim 12, wherein the mounting assembly includes an annular rack extending around a circumference of the second substrate and a drive belt configured to engage the annular rack and rotate the second substrate relative to the first substrate.

\* \* \* \* \*